United States Patent [19]

Lunsford et al.

[11] Patent Number: 4,696,951
[45] Date of Patent: Sep. 29, 1987

[54] ETHYLENE VINYL ACETATE COMPOSITIONS FOR FLOCKING ADHESIVES

[75] Inventors: David Lunsford, Mauldin, S.C.; James L. Walker, Whitehouse Station, N.J.

[73] Assignee: National Starch and Chemical Corporation, Bridgewater, N.J.

[21] Appl. No.: 861,964

[22] Filed: May 12, 1986

[51] Int. Cl.$^4$ .................................................. L08J 9/30
[52] U.S. Cl. ........................................ 521/65; 521/134; 521/149; 526/304
[58] Field of Search ............... 526/304; 521/149, 65/134

[56] References Cited

U.S. PATENT DOCUMENTS

| | | | |
|---|---|---|---|
| 3,708,444 | 1/1973 | Ganzler et al. | 521/149 |
| 3,734,870 | 5/1973 | Schroeder et al. | 521/149 |
| 3,933,691 | 1/1976 | Lindemann | 260/2.5 L |
| 4,001,158 | 1/1977 | Lindemann | 260/29.6 TA |
| 4,044,197 | 8/1977 | Wiest et al. | 526/304 |
| 4,187,353 | 2/1980 | Schroeder | 521/149 |
| 4,446,274 | 5/1984 | Okazaki et al. | 524/812 |
| 4,510,274 | 4/1985 | Okazaki et al. | 523/411 |
| 4,542,182 | 9/1985 | Schuppiser et al. | 524/563 |

OTHER PUBLICATIONS

"Producing Durable Flocked Goods", Vincent J. Moser and Arthur L. Allewelt.
"Acrylic Adhesives for the Textile Flocking Industry"; George C. Kantner and Frank X. Chancler.
"Principles of Flocking"; Ulrich Maag Primary Examiner—Morton Foelak
Attorney, Agent, or Firm—Ellen T. Dec; Edwin M. Szala

[57] ABSTRACT

Foamable, storage stable flocking adhesives are prepared from an aqueous emulsion prepared by the emulsion polymerization of a vinyl ester of an alkanoic acid interpolymerized with:

(a) 5 to 30% by weight of ethylene;
(b) 0.5 to 6% by weight of an N-methylol containing copolymerizable monomer;
(c) 1 to 5% by weight of an olefinically unsaturated carboxylic acid;
(d) 0.2 to 3% by weight of a latex stabilizer; and
(e) 0 to 1% by weight of at least one polyunsaturated copolymerizable monomer.

10 Claims, No Drawings

ETHYLENE VINYL ACETATE COMPOSITIONS FOR FLOCKING ADHESIVES

The present invention is directed to the use of carboxylated ethylene-vinyl acetate-N-methylol containing copolymers in flocking adhesives.

Flocking is a process by which textile fibers are embedded into an adhesive on a substrate producing an article which normally has a velvet or suede-like hand or feel. The flocking process is carried out by passing a substrate, which has been coated or printed with a composition comprising the adhesive polymer, through an electrical field in which short fibers are electrostatically directed and oriented into the adhesive. In another technique, a beater bar orients and embeds the fibers by means of vibration. Still other techniques combine both the electrostatic field and a beater bar presumably yielding optimum flock orientation and density.

It is important in such applications that the resultant flocked products have a soft hand and drape as well as good durability properties: properties primarily controlled by the choice of the flocking adhesive. It is also important that the adhesive system have some resistance to washing and dry cleaning, atmospheric oxidation and ultraviolet and heat degredation appropriate to the intended end use.

In order to effectively apply a flocking adhesive to a substrate, the adhesive must be applied in such a manner that the bulk of the adhesive will remain on the surface of the substrate instead of penetrating it and possibly striking through the fabric. This is most commonly accomplished by thickening the adhesive to a viscosity in excess of 30,000 cps, or by foaming the adhesive, the latter method being preferred since it gives a more uniform coating at lower weight and thus produces a less bulky, softer flocked fabric. Flocking adhesives are generally compounded with thickeners, foaming agents and other auxiliary agents in advance of use, hence it is necessary that they be shelf stable for extended periods of time, sometimes for three weeks or longer.

Heretofore, N-methylol containing comonomers have been polymerized into acrylate based latices for flocking in order to improve the durability, especially the water and solvent resistance thereof. In order to provide a more economical flocking adhesive, ethylene-vinyl acetate-N-methylol containing copolymers have been proposed but found unacceptable since they do not exhibit the required shelf stability under the alkaline pH ranges which are essential for the foaming agents to function, resulting in emulsions which break-down and often gel in periods as short as overnight.

It is therefore an object of the present invention to provide a foamable storage stable flocking adhesive based on ethylene vinyl acetate copolymer emulsions.

SUMMARY OF THE INVENTION

We have now found that foamable flocking adhesives characterized by improved formulation stability may be prepared utilizing an aqueous emulsion prepared by the emulsion polymerization of a vinyl ester of an alkanoic acid interpolymerized with:

(a) 5 to 30% by weight of ethylene;
(b) 0.5 to 6% by weight of an N-methylol containing copolymerizable monomer;
(c) 1 to 5% by weight of an olefinically unsaturated carboxylic acid;
(d) 0.2 to 3% by weight of a latex stabilizer; and
(e) 0 to 1% by weight of at least one polyunsaturated copolymerizable monomer.

The resultant emulsions are combined with suitable thickeners, pigments and foaming agents, generally within pH ranges of 7 to 10, and remain stable under these conditions for periods of a minimum of several weeks.

While the aqueous emulsions utilized herein may be prepared using batch, or slow-addition polymerization techniques, we have found that those prepared by the batch process provide superior dry cleaning solvent resistant products.

As used herein, the term "batch" refers to a process whereby all the major monomers are charged to the reactor initially and the functional monomer(s) are added uniformly and concurrently with the initiators. In contrast, the term "slow-addition" refers to a process whereby wherein water, emulsifying agents and optionally a minor portion of the monomers are initially charged in the reactor and the remaining monomers then added gradually with the initiators over the course of the reaction.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate, vinyl versatate, etc. Of the foregoing, vinyl acetate is the preferred monomer because of its ready availability and low cost.

The N-methylol component is generally N-methylol acrylamide or N-methylol methacrylamide although other mono-olefinically unsaturated compounds containing an N-methylol group and capable of copolymerizing with ethylene and the vinyl ester may also be employed.

The olefinically-unsaturated carboxylic acids are the alkenoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof in amounts sufficient to give between 0.5 and 4% by weight, of monomer units in the final copolymer. In addition, certain copolymerizable monomers which assist in the stability of the copolymer emulsion, e.g., vinyl sulfonic acid and 2-acrylamido-2-methylpropane sulfonic acid are used herein as latex stabilizers. These stabilizers are added in amounts of from about 0.2 to 3% by weight of the monomer mixture.

Optionally, polyunsaturated copolymerizable monomers may also be present in small amounts, i.e., up to about 1% by weight. Such comonomers would include those polyolefinically-unsaturated monomers copolymerizable with vinyl acetate and ethylene, such as lower alkenyl lower alkenoates, for example, vinyl crotonate, allyl acrylate, allyl methacrylate; di-lower alkenyl alkanedioates, for example, diallyl maleate, divinyl adipate, diallyl adipate; dilower alkenyl benzendicarboxylates, for example, diallyl phthalate; lower alkanediol di-lower alkenoates, for example, ethylene glycol diacrylate, ethylene glycol dimethacrylate, butanediol dimethacrylate, lower alkylene bis-acrylamides and lower alkylene bis-methacrylamides, for example, methylene bis-acrylamide; triallyl cyanurate, etc.

In accordance with the procedure utilized herein the vinyl acetate, ethylene, N-methylol acrylamide and the carboxylic acid are polymerized in an aqueous medium under pressures not exceeding 100 atmospheres in the presence of a catalyst and at least one emulsifying agent, the aqueous system being maintained, by a suitable buffering agent, at a pH of 2 to 6, the catalyst being added incrementally. In the preferred embodiment where a batch process is used, the vinyl acetate is emulsified in water and thoroughly agitated in the presence of ethylene under the working pressure to effect solution of the ethylene in the vinyl acetate up to the substantial limit of its solubility under the condition existing in the reaction zone, while the vinyl acetate is gradually heated to polymerization temperature. The homogenization period is followed by a polymerization period during which the catalyst, which consists of a main catalyst or initiator, and may include an activator, is added incrementally, and the N-methylol and carboxylic acid components are similarly added incrementally, the pressure in the system being maintained substantially constant by application of a constant ethylene pressure if required. In the case of slow addition, some of the vinyl acetate is generally charged initially, and the remainder pre-emulsified with the N-methylol component and carboxylic acid and added incrementally.

Suitable as polymerization catalysts are the water-soluble free-radical-formers generally used in emulsion polymerization, such as hydrogen peroxide, sodium persulfates, potassium persulfate and ammonium persulfate, as well as t-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0,01 to 1% by weight, based on the total amount of the emulsion. The free-radical-formers can be charged in the aqueous emulsifier solution or be added during the polymerization in doses.

The dispersing agents are all the emulsifiers generally used in emulsion polymerization, as well as optionally present protective colloids. It is also possible to use emulsifiers alone or in mixtures with protective colloids. The emulsifiers can be anionic, cationic or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, as well as esters of sulfosuccinic acid. Suitable cationic emulsifiers are, for example, alkyl quaternary ammonium salts, alkyl quaternary phosphonium salts and ternary sulfonium salts. Examples of suitable non-ionic emulsifiers are the addition products 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof. Preferably nonionic and/or anionic emulsifiers are used as emulsifying agents in amounts of 1 to 6% by weight of the polymerisate.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The reaction is generally continued until the residual vinyl acetate content is below about 1%. The completed reaction product is then allowed to cool to about room temperature, while sealed from the atmosphere. The pH is then suitably adjusted to a value in the range of 4.5 to 7, preferably 5 to 6 to insure maximum stability.

By following the procedure described above, particularly the initial saturation of the polymerization mixture with ethylene before polymerization is initiated, there can be produced the stable carboxylated vinyl acetate-ethylene-N-methylol acrylamide interpolymer latex characterized above, with the copolymer having an ethylene content of 5 to 30%, a glass transition temperature of between $-30$ and $+15°$ C., an intrinsic viscosity of 1 to 2.5 dl./g., and an average particle size of 0.1 to 2u.

The resultant emulsion polymers are then formulated using conventional components and techniques to produce the foamable flocking adhesives of the present invention. Thus, the copolymers are compounded, if necessary, with sufficient thickeners to provide a viscosity within the range of about 10,000 to 30,000 cps.; they are adjusted (generally with ammonium hydroxide) to a pH of 7 to 10, preferably 7.5 to 8.5, and suitable foaming agents added thereto.

The thickeners useful herein are those conventionally employed in the art and include, for example, hydroxyethylcellulose, carboxymethylcellulose, various classes of polyacylate-hydrolyzed acrylonitriles as well as the carboxylic acid/acrylate emulsions or solutions. Typical of such thickeners are Acrysol ASE-60 or ASE-95 from Rohm and Haas, Carbopol from B. F. Goodrich, Natrosol 250HR from Hercules, Paragum 500 or 501 from Parachem Southern, etc. These thickeners are generally present in the amounts of 1 to 5% by weight based on the adhesive solids.

The foaming agents utilized herein are generally the water soluble salts of aliphatic carboxylic acids containing 16 to 20 carbon atoms, preferably those of the 18 carbon atom acids, representative of which are the alkali metal, ammonium or amine salts of stearic acid, tallow fatty acids and oleic acid. Most commonly employed is ammonium stearate. The foaming agents are present in amounts of 1 to 10%, preferably 2 to 8%, by weight of the adhesive solids.

Other additives including auxiliary foaming agents, foam stabilizers, ultraviolet absorbers, pigments, catalysts, fire retardants and the like may also be present in these foamable adhesives in amounts conventional in the art. In particular, since acid catalysts accelerate the crosslinking, a suitable catalyst for the N-methylol components is generally employed. Such acid catalysts are mineral acids or organic acids including latent acid catalysts, such as phosphoric acid, tartaric acid, citric acid, or acid salts, such as chromium-III salts, aluminum chloride, ammonium chloride, zinc nitrate or magnesium chloride, as known in the art. The amount of catalyst is generally about 0.5 to 2% of the total emulsion polymer solids.

Virtually any surfaces typically subjected to flocking may be flocked using the present adhesives. Typical surfaces or substrates include woven and non-woven fabrics or scrims, paper, urethane foams, rubbers, fiberboard, fiberglass, polyethylene or polypropylene films and the like.

The choice of fibers which can be applied by means of the adhesives of the invention is not critical. Thus, the flocked fibers may be flock obtained from cotton linters, wood pulp, rayon, polyamides, polyacrylics, polyesters, polyacetates, triacetates, polyolefins, glass fibers, wool, asbestos, etc. Staple fibers having an average length of from about 0.2mm to about 2mm are preferably used. Cut or milled flocks can be used with the length of the miller flocks varying from about 0.2mm to 1mm and those of the cut flock from 0.3 to 5mm. If desired they can be colored or pigmented before application.

When required for use, the formulated flocking adhesive is foamed using equipment readily available for foaming compositions. This is accomplished by beating air or another gas into the latex composition until a fine, uniform cell structure foam is obtained having the desired foam cell size and body. The volume of the latex composition is increased from about 2 to 10 times its original volume by the foaming or frothing process, preferably from 2 to 4 times its original volume.

The resultant foamed adhesive is then applied to the substrate using any conventional means, e.g. knife coater. After application of the foamed latex to the base material, the flocking material is applied to the surface of the foam coated and the composite is then dried at an ambient to elevated temperature.

The drying step is carried out for a period of time and at a temperature sufficient to dry the applied foamed latex. These will vary depending upon the particular foamed latex employed and the amount thereof applied to the base material. The latex foam can be air-dried at ambient temperature conditions. However, drying can be over a period of from about 1 to 5 minutes at from about 125 to 175° C.

As to the amount of the flock adhesive used, it has been found that the amount of adhesive per square yard may vary from 0.5 to 3.0 ounces and the thickness of the adhesive coating from 0.015 to 0.025 inch in the set state. There is a direct relationship between the amount of flock fiber which may be attached and the amount of adhesive employed. However, since it is contemplated that a rather broad range of flock lengths and quality may be used, the amount of adhesive and the thickness of the coating may well be extended under certain conditions depending on the type of fiber employed.

Several optional steps may be included in the process. For example, the flock itself may be treated with a suitable flame-retardant reagent. Additionally artistic and ornamental effects may be obtained by various techniques. For instance, by applying adhesive in an ornamental pattern, flock will adhere to the areas constituting the pattern. Colored adhesives can be used to create further effects thereby varying the ornamental appearance of the product.

The following examples are given to illustrate the present invention, but it will be understood that they are intended to be illustrative only and not limitative of the invention. In the examples, all parts are by weight unless otherwise indicated.

EXAMPLE I

This example describes the batch preparation of the emulsion polymers utilized as a base for the flocking adhesives in accordance with the present invention.

A 10 liter stainless steel autoclave equipped with heating/cooling means, variable rate stirrer and means of metering monomers and initiators was employed. To the 10 liter autoclave was charged 450 g (of a 20% w/w solution) sodium alkyl aryl polyethylene oxide sulphate (3 moles ethylene oxide), 40 g (of a 70% w/w solution in water) alkyl aryl polyethylene oxide (30 mole ethylene oxide), 90 g sodium vinyl sulfonate (25% solution in water), 0.5 g sodium acetate, 5 g (of a 1% solution in water) ferrous sulfate solution, 2 g sodium formaldehyde sulfoxylate and 2500 g water. After purging with nitrogen all the vinyl acetate (2000 g) was added and the reactor was pressurized to 750 psi with ethylene and equilibrated at 50° C. for 15 minutes.

The polymerization was started by metering in a solution of 25 g. tertiary butyl hydroperoxide in 250 g of water and 20 g sodium formaldehyde sulfoxylate in 250 g water. The initiators were added at a uniform rate over a period of 5¼ hours.

Concurrently added with the initiators over a period of 4 hours was an aqueous solution of 280 g N-methylol acrylamide (48% w/w solution in water), 45 g of acrylic acid, 100 g of sodium alkyl aryl polyethylene oxide (3 mole ethylene oxide) sulfate (20% w/w solution in water), 1.5 g of sodium acetate in 400 g of water.

During the reaction the temperature was controlled at 65° C. to 70° C. by means of jacket cooling. At the end of the reaction the emulsion was transferred to an evacuated vessel (30 L) to remove residual ethylene from the system.

This procedure resulted in a polymeric composition of ethylene, vinyl acetate, N-methylol acrylamide and acrylic acid (E/VA/NMA/AA) in a 25:75:3:1 ratio.

EXAMPLE II

This example describes the preparation of an emulsion similar to that described in Example I but using the slow-addition polymerization procedure.

To the 10 liter autoclave was charged 90 g (of a 20% w/w solution in water) sodium alkyl aryl polyethylene oxide sulphate (3 moles ethylene oxide), 6 g (of a 70% w/w solution in water) alkyl aryl polyethylene oxide (30 moles ethylene oxide), 20 g (of a 25% w/w solution) sodium vinyl sulfonate, 2 g sodium formaldehyde sulfoxylate 0.5 g sodium acetate, 5 g (of a 1% w/w solution in water) ferrous sulphate solution and 2000 g water. After purging with nitrogen, 300 g vinyl acetate were charged to the reactor. The reactor was then pressurized to 750 psi with ethylene and equilibrated at 50° C. for 15 minutes. The polymerization was started by metering in a solution of 35 g tertiary butyl hydroperoxide in 250 g water and 35 g sodium formaldehyde sulfoxylate in 250 g water over a period of 6½ hours.

Concurrently added with the initiators over a period of 4 hrs was a pre-emulsified blend of 3075 g. vinyl acetate, 150 g (48% w/w solution in water) N-methylol acrylamide, 45 g acrylic acid, 810 g ( of a 20% w/w solution in water) sodium alkyl aryl polyethylene oxide sulphate (3 mole ethylene oxide), 60 g (of a 70% w/w solution in water) alkyl aryl polyethylene oxide (30 mole ethylene oxide), 1 g sodium acetate, 60 g (of a 25% w/w solution in water) sodium vinyl sulfonate in 600 g water.

During the polymerization, the temperature of the reaction was maintained at 55°-60° C. by means of cooling and the pressure at 750 psi of ethylene by adding it when necessary. At the end of the additions of monomers and catalysts, the emulsion was transferred to an evacuated vessel following the procedure in Ex. 1.

Using procedures similar to those described in Examples I, three additional emulsions were prepared. For comparative purposes, Emulsions 4 and 5 were prepared with no carboxyl containing comonomer. The polymeric compositions of the five emulsions are shown in Table I.

TABLE I

| Emulsion | Composition | | | | Polymeric Procedure |
| | E | VA | NMA | AA | |
| --- | --- | --- | --- | --- | --- |
| 1 | 25 | 75 | 3 | 1 | batch |
| 2 | 25 | 75 | 3 | 1 | slow addition |
| 3 | 20 | 80 | 2.5 | 1 | batch |
| 4 | 20 | 80 | 5.5 | 0 | batch |
| 5 | 25 | 75 | 5 | 0 | batch |

Emulsions 1-5 were then used to prepare foamable flocking adhesives which were subjected to the tests described below. The emulsion copolymers were compounded into adhesives using the following formula:

| Ingredients | Parts by Weight |
| --- | --- |
| Latex (@ 53% solids) | 68.4 |
| Clay Slurry (64% solids) | 23.0 |
| Ammonium Stearate | 1.7 |
| Catalyst (20% solution) | 1.7 |
| Acrylate Thickener | 1.7 |
| Ammonia (26%) | 0.7 |
| Water | 2.8 |

The following coating parameters were used to prepare flocked fabric for testing purposes:

COATING PARAMETERS

Flock: Nylon
Substrate: Polyester
Foam: 1:1 ratio of Air to Compound
Wet Coating Thickness: 15 mils
Flocking Application: Electrostatic
Flock Time: 30 seconds
Drying Conditions: 5 minutes at 120° C.
Curing Conditions: 5 minutes at 155° C.

The following test procedures were utilized in evaluating the binders prepared herein:

TESTING METHODS

Dry Abrasion Resistance: This test measures the durability of flocked fabrics to abrasive or rubbing type actions. A Tabor Abrasion Test was done using a CS-17 wheel for 4000 cycles. Samples were rated on a scale of 1.0 to 5.0 with 1.0 equal to complete flock loss and 5.0 equal to no flock loss. A rating of 3.0 is considered average/satisfactory with a rating of 4.0 desired.

Wet Abrasion Resistance: This test measures the durability of wet flocked fabrics to abrasive or rubbing type actions. In particlar, this test would simulate the type of abrasion that would be experienced in a home laundering. A Tabor Abrasion Tester was utilized with Wheel #CS-17 for 1000 cycles. Samples were rated similar to the method used for Dry Abrasion Resistance. Samples were prepared by soaking them in water and then passing them through nip rollers @20 psi to insure consistent moisture level.

Hand: The purpose of this test is to determine the hand feel of each sample in terms of softness. Samples were compared to each other and ranked in order of softness, with 5.0 being the softest. Rating is subjective using a panel of 2 or 3 people. The softest hand possible is desired.

Pluck Strength: The pluck strength test measures the amount of force required to remove bound fibers from the adhesive. A Kelly Clamp is used to secure several flock fibers which is then connected to a hand held scale for measuring the force required to remove bound fibers. Pluck strength values of 2.0 lbs are normally required, with values of 2.5 to 3.0 being desired.

Solvent Resistance: This test measures the durability of the flocked fabric to repeated dry cleaning cycles. Samples were folded, clamped and then submitted to a commercial dry cleaning operation for 3 to 6 cycles. Samples were rated by amount of flock loss from both face and fold edges of the fabric. A rating of 1.0 indicates complete flock loss and a rating of 5.0 equals no flock loss.

| Test | Emulsion Number | | | | |
| | 1 | 2 | 3 | 4 | 5 |
| --- | --- | --- | --- | --- | --- |
| Dry Abrasion | 4.5 | 4.5 | 4.5 | 4.5 | 4.5 |
| Wet Abrasion | 4.0–4.5 | 4.0 | 3.5 | 4.0 | 4.0 |
| Pluck Strength (in lbs) | 2.6 | 3.14 | 2.4 | 2.7 | 2.8 |
| Solvent Resistance | | | | | |
| 3 Commercial Cycles | 4.5 | 2.0 | 5.0 | 5.0 | 4.0 |
| 6 Commercial Cycles | 4.0 | 1.5 | 5.0 | 5.0 | 3.5 |
| Hand (5 = softest) | 5* | 5* | 5* | 1 | 2 |

*These samples were equal in softness.

The above results show that a superior balance of strength and softness can be achieved using the flocking ahesives of the present invention. The results also show that emulsions prepared using the batch polymerization procedure exhibit superior dry cleaning (solvent) resistance and hence this is the preferred procedure for producing flocking adhesives for applications wherein dry cleaning resistance is essential.

The flocking adhesives were also subjected to compound stability testing by measuring the viscosity as a function of time. A Brookfield Viscometer with #6 Spindle at 20 RPM was used for testing at room temperature. pH measurements were also made and recorded.

| | Compound Stability Testing pH/Viscosity (cps) | | | | |
| Time/Emulsion | 1 | 2 | 3 | 4 | 5 |
| --- | --- | --- | --- | --- | --- |
| Initial | 8.3/14,200 | 8.8/18,000 | 8.25/14,000 | 8.3/14,000 | 8.6/14,260 |
| 1 day | 8.2/17,300 | Not tested | 8.2/20,000 | Not tested | Not tested |
| 2 days | 8.2/16,600 | 8.0/17,000 | 8.2/20,500 | Not tested | Not tested |
| 3 days | Not tested | Not tested | Not tested | 7.9 gelled | 7.7/30,000 |
| 1 week | 7.0/22,900 | 7.8/21,000 | 8.15/29,400 | — | 7.3/60,000 |

| Time/Emulsion | Compound Stability Testing pH/Viscosity (cps) | | | | |
|---|---|---|---|---|---|
| | 1 | 2 | 3 | 4 | 5 |
| 2 weeks | 7.0/22,900 | 7.0/21,000 | 6.8/34,200 | — | 6.9/gelled |
| 3 weeks | 6.9/22,700 | 7.0/22,500 | 6.8/35,500 | — | — |

As discussed previously, sufficient compound stability on the alkaline side is needed to produce a foamable flock adhesive. The above results show that Emulsions 1, 2, and 3 of the invention have excellent compound stability compared to the non-carboxylated ethylene/vinyl acetate copolymers of Emulsions 4 and 5.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A foamable flocking adhesive composition characterized by an excellent balance of softness, strength, and formulation stability comprising a thickener selected from the group consisting of hydroxyethylcellulose, carboxymethylcellulose, polyacrylatehydrolyzed acrylonitrile and carboxylic acid/acrylate emulsions or solutions, pigments, a foaming agent activatable by beating air or another gas into the composition comprising a water soluble salt of an aliphatic carboxylic acid containing 16 to 20 carbon atoms, and an aqueous emulsion, the latter prepared by the emulsion polymerization of a copolymer consisting essentially of:
   (a) a vinyl ester of an alkanoic acid having 1 to 13 atoms interpolymerized with the following comonomers;
   (b) 5 to 30% by weight of ethylene;
   (c) 0.5 to 6% by weight of N-methylol acrylamide or N-methylol methacrylamide;
   (d) 1 to 5% by weight of an alkenoic acid having 3 to 6 carbon atoms or an alkenedioic acid having 4 to 6 carbon atoms;
   (e) 0.2 to 3% by weight of a latex stabilizer; and
   (f) 0 to 1% by weight of at least one polyunsaturated copolymerizable monomer;
the vinyl ester being added in an amount to total 100%.

2. The adhesive of claim 1 wherein the aqueous emulsion is prepared using batch polymerization procedures.

3. The adhesive of claim 1 wherein the vinyl ester in vinyl acetate.

4. The adhesive of claim 1, wherein the N-methylol containing comonomer and is N-methylol acrylamide or N-methylol methacrylamide.

5. The adhesive of claim 1 wherein the olefinically unsaturated carboxylic acid is selected from the group consisting of acrylic acid, methacrylic acid, crotonic acid, itaconic acid, maleic acid and fumaric acid.

6. The adhesive of claim 1 wherein the latex stabilizer is vinyl sulfonic acid or 2-acrylamido-2-methylpropane sulfonic acid.

7. The adhesive of claim 1 wherein there is additionally present up to 1% by weight of a polyunsaturated copolymerizable monomer selected from the group consisting of vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide and triallyl cyanurate.

8. The adhesive of claim 1 which additionally contains an acid catalyst in an amount of 0.5 to 2% by weight of the emulsion polymer solids.

9. The adhesive of claim 1 containing sufficient thickener to provide a viscosity of 10,000 to 30,000 cps.

10. The adhesive of claim 1 wherein the foaming agent is present in an amount of 1 to 10% by weight of the adhesive solids.

* * * * *